US012686079B2

(12) United States Patent
Weidgang et al.

(10) Patent No.: US 12,686,079 B2
(45) Date of Patent: Jul. 21, 2026

(54) LASER WELDING OF BUSBARS WITH BEAM SHAPING

(71) Applicant: TRUMPF Laser—und Systemtechnik GmbH, Ditzingen (DE)

(72) Inventors: Steven Weidgang, Ditzingen (DE); Johannes Seebach, Stuttgart (DE); Oliver Bocksrocker, Sachsenheim (DE); Joerg Smolenski, Lauterbourg (FR); Nicolai Speker, Pleidelsheim (DE)

(73) Assignee: TRUMPF LASER—UND SYSTEMTECHNIK GMBH, Ditzingen (DE)

( * ) Notice: Subject to any disclaimer, the term of this patent is extended or adjusted under 35 U.S.C. 154(b) by 871 days.

(21) Appl. No.: 17/741,461

(22) Filed: May 11, 2022

(65) Prior Publication Data

US 2022/0266386 A1     Aug. 25, 2022

Related U.S. Application Data

(63) Continuation of application No. PCT/EP2020/083612, filed on Nov. 27, 2020.

(30) Foreign Application Priority Data

Nov. 27, 2019     (DE) ..................... 10 2019 218 398.0

(51) Int. Cl.
B23K 26/073     (2006.01)
B23K 26/062     (2014.01)
(Continued)

(52) U.S. Cl.
CPC ...... B23K 26/0734 (2013.01); B23K 26/0626 (2013.01); B23K 26/123 (2013.01);
(Continued)

(58) Field of Classification Search
CPC .............. B23K 26/0734; B23K 26/244; B23K 26/0626; B23K 26/062; B23K 26/123;
(Continued)

(56) References Cited

U.S. PATENT DOCUMENTS 8,230,594 B1 *   7/2012   Bossard ................. B23K 26/24
                                                         219/121.64
8,456,523 B2     6/2013   Stork
                          (Continued)

FOREIGN PATENT DOCUMENTS

CN          103097931 A      5/2013
CN          107848069 A      3/2018
                  (Continued)

*Primary Examiner* — Elizabeth M Kerr
*Assistant Examiner* — Simpson A Chen
(74) *Attorney, Agent, or Firm* — LEYDIG VOIT & MAYER LTD.

(57)     ABSTRACT

A method for joining busbars includes reshaping a raw laser beam to obtain a reshaped laser beam. The reshaped laser beam comprises a core focus portion and at least one ring focus portion. The core focus portion and the ring focus portion are coaxial with respect to one another. The ring focus portion surrounds the core focus portion. The method further includes directing the reshaped laser beam to a plurality of busbars to weld the plurality of busbars to one another along at least one weld seam.

19 Claims, 4 Drawing Sheets

(51) Int. Cl.

| | | |
|---|---|---|
| *B23K 26/12* | (2014.01) | |
| *B23K 26/244* | (2014.01) | |
| *B23K 26/26* | (2014.01) | |
| *B23K 101/38* | (2006.01) | |
| *B23K 103/12* | (2006.01) | |
| *H01M 50/516* | (2021.01) | |

(52) U.S. Cl.

CPC ............ *B23K 26/244* (2015.10); *B23K 26/26* (2013.01); *H01M 50/516* (2021.01); *B23K 2101/38* (2018.08); *B23K 2103/12* (2018.08)

(58) Field of Classification Search

CPC B23K 26/26; B23K 2103/12; B23K 2101/38; H01M 50/516

USPC .......................................................... 219/74

See application file for complete search history.

(56) References Cited

U.S. PATENT DOCUMENTS

| | | | | |
|---|---|---|---|---|
| 9,482,821 | B2 | 11/2016 | Huber et al. | |
| 11,351,633 | B2 | 6/2022 | Kangastupa | |
| 11,752,572 | B2 | 9/2023 | Andreasch | |
| 2011/0210099 | A1 | 9/2011 | Heinrici et al. | |
| 2013/0223792 | A1* | 8/2013 | Huber ................... | G02B 6/262 |
| | | | | 385/127 |
| 2015/0314393 | A1* | 11/2015 | Woo ..................... | B23K 26/123 |
| | | | | 219/121.64 |
| 2016/0315303 | A1 | 10/2016 | Eberhard | |
| 2017/0144253 | A1* | 5/2017 | Martinsen ............... | B22F 10/28 |
| 2018/0056441 | A1* | 3/2018 | Matsumoto ........ | B23K 26/0344 |
| 2018/0180813 | A1* | 6/2018 | Gross .................... | B33Y 30/00 |
| 2019/0039176 | A1* | 2/2019 | Speker .................. | B23K 26/06 |
| 2019/0118299 | A1 | 4/2019 | Kangastupa | |
| 2019/0258009 | A1 | 8/2019 | Huber et al. | |
| 2019/0262942 | A1 | 8/2019 | Haug et al. | |
| 2020/0009685 | A1* | 1/2020 | Kumazawa ........ | H01M 50/522 |
| 2020/0030909 | A1 | 1/2020 | Andreasch | |
| 2020/0036064 | A1* | 1/2020 | Hess ................... | H01M 10/625 |
| 2020/0254562 | A1* | 8/2020 | Brescoe ............. | G02B 6/02042 |
| 2020/0306878 | A1* | 10/2020 | Kangastupa .......... | B23K 26/24 |
| 2020/0310055 | A1* | 10/2020 | Mordarski ............. | G02B 6/262 |
| 2021/0060701 | A1* | 3/2021 | Markushov .......... | B23K 26/242 |

FOREIGN PATENT DOCUMENTS

| | | |
|---|---|---|
| CN | 109789512 A | 5/2019 |
| DE | 102006042097 A1 | 4/2008 |
| DE | 102009056592 A1 | 6/2011 |
| DE | 102010003750 A1 | 10/2011 |
| DE | 102016118189 A1 | 3/2018 |
| EP | 1514634 A1 | 3/2005 |
| EP | 2556397 B1 | 2/2013 |
| JP | 2000275569 A | 10/2000 |
| KR | 20180116108 A | 10/2018 |
| WO | WO 2011124671 A1 | 10/2011 |
| WO | WO 2012102138 A1 | 8/2012 |
| WO | WO 2017157644 A1 | 9/2017 |
| WO | WO 2019129917 A1 | 7/2019 |

* cited by examiner

LASER WELDING OF BUSBARS WITH BEAM SHAPING

CROSS REFERENCE TO RELATED APPLICATIONS

This application is a continuation of International Application No. PCT/EP2020/083612 (WO 2021/105344 A1), filed on Nov. 27, 2020, and claims benefit to German Patent Application No. DE 10 2019 218 398.0, filed on Nov. 27, 2019. The aforementioned applications are hereby incorporated by reference herein.

FIELD

Embodiments of the present invention relate to a method for joining busbars, in particular Cu-containing busbars, by laser welding.

BACKGROUND

Powerful batteries are used for electromobility, for example. Batteries typically include of a multiplicity of battery cells, the electrical poles of which are interconnected via so-called busbars. Electrical consumers, for instance power electronics systems, can likewise be connected to a current source such as a battery, for example, via busbars. In this case, busbars generally have to be connected (joined) to one another. In this case, the connection location should have the lowest possible electrical resistance and should be mechanically robust.

For joining busbars it is customary for busbars that are to be connected to be screwed together. Screwing together is easy to carry out, but a not inconsiderable time is required for assembly, and it is necessary to set up access to the screwing location from two opposite sides. Moreover, the electrical resistance at the contact location is generally relatively high.

Furthermore, it is known to produce the joined connection of busbars using an NIR laser (laser having a wavelength in the near infrared spectral range, NIR) with a high power class. Particularly during the welding of Cu-containing busbars and given the busbar-typical thicknesses of the busbars, spatter and pores often occur here, however, which can result in a considerable reduction of cross-sectional area at the weld seam, whereby the mechanical strength is impaired and the electrical resistance is increased.

DE 10 2010 003 750 A1 discloses altering the beam profile characteristic of a laser beam by means of a multiclad fiber.

SUMMARY

Embodiments of the present invention provide a method for joining busbars. The method includes reshaping a raw laser beam to obtain a reshaped laser beam. The reshaped laser beam comprises a core focus portion and at least one ring focus portion. The core focus portion and the ring focus portion are coaxial with respect to one another. The ring focus portion surrounds the core focus portion. The method further includes directing the reshaped laser beam to a plurality of busbars to weld the plurality of busbars to one another along at least one weld seam.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
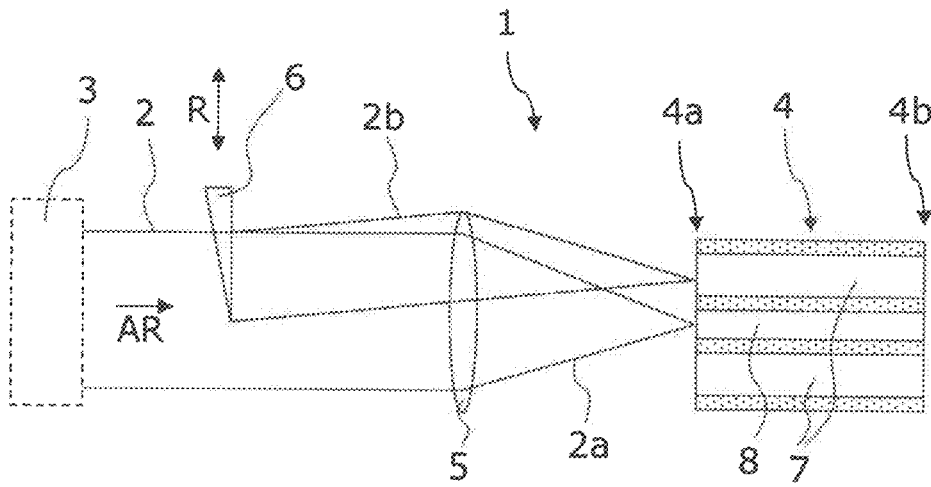
FIG. 1 shows a schematic view of an apparatus for reshaping a raw laser beam, according to some embodiments of the invention.

Embodiments of the invention provide a method for joining busbars which enables joined connections of high mechanical strength and low electrical resistance to be produced.

According to embodiments of the invention, a method of the type mentioned in the introduction which is distinguished by the fact that a reshaped laser beam is obtained from a raw laser beam by means of beam reshaping, and the reshaped laser beam is directed onto the busbars to be joined, such that the busbars are welded to one another along at least one weld seam, and wherein a core focus portion and at least one ring focus portion are produced as a result of the beam shaping in the reshaped laser beam, the core focus portion and the ring focus portion being coaxial with respect to one another and the ring focus portion surrounding the core focus portion.

In the context of the invention it has been discovered that it is possible to avoid the above-described problems in the application of a conventional NIR laser beam with high power and just a single laser spot (single spot) such as has typically been used hitherto when joining busbars, in particular Cu-containing busbars. For this purpose, the laser beam is subjected to beam shaping, a core focus portion and at least one surrounding ring focus portion being set up in the reshaped laser beam. These two portions are used coaxially and directed onto the busbars to be welded. Setting up the two portions reduces spatter formation during welding and also reduces the arising of pores in the weld seam. The beam reshaping makes it possible to reduce the weld pool dynamics during the welding process. The welding process according to embodiments of the invention is typically effected in the deep welding regime, i.e. with formation of a vapor capillary, generally in the region of the core focus portion.

According to embodiments of the invention, a connection between the busbars which is mechanically fixed and has good electrical conductivity can be set up. The method is well suited in particular to the busbars composed of copper or copper-containing alloys and to material thicknesses that typically occur in the case of busbars, in particular of from 2 mm to 10 mm.

In the context of the invention, the joining can be effected from one side in a simple manner; in particular, access from mutually opposite sides is generally not necessary. The method according to embodiments of the invention is highly productive, and can be effected in particular with higher feed speeds than in the case where a conventional single laser spot (single spot) is used. The low pore and spatter formation results in a constant bonding cross-section, which reliably keeps the electrical resistance low and reliably keeps the mechanical strength high. Moreover, less spatter results in a lower risk of short circuits.

The intensity of the reshaped laser beam preferably has a double top hat profile, the laser intensity over the area of the core focus portion being approximately constant (and preferably fluctuating around an average intensity IK of the core focus portion by a maximum of 25%), and furthermore the laser intensity over the area of the ring focus portion also being approximately constant (and preferably fluctuating around an average intensity IR of the ring focus portion by a maximum of 25%), the intensity IK being significantly higher than the intensity IR, usually where $IK \geq 3*IR$ or $IK \geq 6*IR$.

The reshaping of the raw laser beam that is to be applied in accordance with the method according to embodiments of the invention is preferably effected by means of feeding the raw laser beam into a multiclad fiber (see below), but can also be effected by other beam reshaping elements, for instance diffractive optical elements, beam splitters and/or lens systems.

The busbars can be used in particular for power electronics or in the field of E-mobility. In particular, the busbars can be used for interconnecting battery cells or connecting electrical consumers to a battery or some other current source. The busbars are typically produced from copper (for instance of the ETP type, uncoated) or a Cu-containing alloy. A typical Cu content in a Cu-containing alloy of a busbar is 25% by weight or more, usually 50% by weight or more, and often 75% by weight or more.

In one preferred variant of the method according to an embodiment of the invention, the beam reshaping is effected by means of a multiclad fiber, a first part of the raw laser beam being fed into a core fiber of the multiclad fiber and at least one second part of the raw laser beam being fed into a ring fiber of the multiclad fiber at an input end, the ring fiber surrounding the core fiber, and the reshaped laser beam being obtained at an output end of the multiclad fiber. This procedure enables the core focus portion and the ring focus portion to be set up in a simple manner. Moreover, by way of feeding in the first part and second part, it is possible in a relatively simple manner to change the energy distribution between the beam portions in the reshaped laser beam and to adapt it to a specific joining task. Finally, by means of the multiclad fiber it is possible to obtain a power density that is very uniform within the core focus portion and ring focus portion, which has proved worthwhile for the quality of the weld seam when joining the busbars.

Preference is given to a variant in which a used laser power is initially decreased and then increased again during the welding of a start section of the weld seam, and the used laser power is decreased during the welding of an end section of the weld seam. These power ramps can reduce material ejection and spatter formation and also the formation of pores and notches at the weld seam, in particular during the welding of the start section and the end section of the weld seam, but also in the intervening middle section. The application of power ramps has proved particularly worthwhile primarily in the case of Cu-containing busbars. During the welding of the middle section of the weld seam (between start section and end section), the used laser power typically remains constant, typically at the maximum laser power used within the welding process. By way of example, the start section extends over 25% or less of the length of the entire weld seam, and the end section likewise extends over 25% or less of the length of the entire weld seam. The start section and the end section are usually of similar length, e.g. the length of the start section and the length of the end section differing by a maximum of a factor of 2.

One advantageous further development of this variant provides that the used laser power is initially decreased and increased again continuously, in particular linearly with time or linearly with the welding distance, during the welding of the start section, and is decreased continuously, in particular linearly with time or linearly with the welding distance during the welding of the end section. This has proved worthwhile in practice and is simple to control.

In one particularly preferred further development, it is provided that, in each case compared with a maximally used laser power, the used laser power is initially decreased by 30-50% and increased again by 30-50% during the welding of the start section, and is decreased by 50-70% during the welding of the end section. This has resulted in a particularly good weld seam quality being established.

One further development which is also advantageous provides that a division of the used laser power between the core focus portion and the at least one ring focus portion remains constant during the welding of the start section and of the end section compared with the welding of a middle section of the weld seam between the start section and the end section. This simplifies the method and has proved worthwhile in practice for a good weld seam quality. Alternatively, it is also possible to vary the division of the used laser power over the start section, the middle section and/or the end section; in this case, for example, the power proportion for the core focus section can initially be increased and then be decreased again in the start section, can be kept constant in the middle section, and can be increased again in the end section, in order to ensure in all sections a substantially uniform penetration depth of the vapor capillary at a constant feed speed.

Preference is furthermore given to a variant in which for the proportion AK, allotted to the core focus portion, of the total laser power used in total during the welding, the following holds true: $50\% \leq AK \leq 80\%$, preferably $55\% \leq AK \leq 75\%$. With this power proportion for the core focus portion it is possible to achieve a particularly calm melt pool during the welding process and a high-quality weld seam.

Preference is likewise given to a variant in which for a diameter DR of the ring focus portion and a diameter DK of the core focus portion, the following holds true:

$$1.5 \leq DR/DK \leq 6,$$

preferably where $2 \leq DR/DK \leq 5$, particularly preferably $2.5 \leq DR/DK \leq 4.5$, very particularly preferably $DR/DK=4$. These size relationships have likewise proved worthwhile in order to obtain a weld with reduced spatter and few pores. DR and DK can be determined and compared for example at a focus of the reshaped laser beam, typically near the surface of the busbar(s) facing the laser beam.

Preference is likewise given to a variant which provides that the reshaped laser beam is directed onto the busbars along a beam direction during welding, the beam direction being inclined toward or inclined away from the already produced weld seam by a pivot angle α relative to a surface normal of the busbar(s) facing the reshaped laser beam in a principal plane containing the surface normal and a feed direction of the welding process,
where 3°≤α≤8°,
preferably 4°≤α≤7,
particularly preferably α=5°.

The welding can thus be effected in "leading" or "trailing" fashion in this variant. By applying the pivot angle, it is possible to reduce the reflection of laser radiation at the surface of the busbar(s) facing the laser beam, which increases the utilized laser power for the welding process, particularly if use is made of laser radiation in the near infrared range (e.g. 1000 nm-1100 nm) in the case of Cu-containing busbars. Moreover, a reflection of laser radiation into the laser optical unit can be avoided, and damage to the laser optical unit can thus be precluded.

What is also advantageous is a variant in which during the welding a protective gas, in particular argon, is guided onto a melt pool at the surface of the busbar(s). The protective gas avoids oxidation processes at the melt pool, and can help to calm the melt pool dynamics. The protective gas argon can be used in particular if lustrous weld seams are intended to be obtained.

What is particularly advantageous is a variant in which the position at least of parts of the busbars is determined by a camera system, and wherein the reshaped laser beam is directed onto the busbars by a scanner optical unit, the scanner optical unit being aligned in an automated manner with the aid of the position of the busbars determined by the camera system during the welding process. A particularly high precision and reproducibility of the welding process can be achieved as a result.

In one preferred variant, it is provided that a first busbar and a second busbar are arranged in an overlapping manner in an overlap region, in particular are pressed onto one another, and the at least one weld seam is placed in the overlap region, such that the weld seam projects through the first busbar right into the second busbar or through the second busbar. A particularly stable mechanical connection can be achieved with overlapping busbars. Moreover, the electrical resistance can be reduced by means of enlarging the overlap region and optionally a plurality of weld seams situated next to one another. With method control in the regime of partial penetration welding, i.e. if the weld seam does not reach the underside of the lower busbar, there is no risk of seam collapse at the underside. This variant can also be used well with cost-effective, stamped busbars.

Preference is given to one development of this variant in which wherein a plurality of, in particular two or three, weld seams are placed next to one another in the overlap region of the first and second busbars, such that the weld seams in each case project through the first busbar right into the second busbar or through the second busbar. By means of a plurality of weld seams, it is possible for the mechanical strength to be increased and the electrical resistance to be reduced. The plurality of weld seams are typically spaced apart laterally from one another by non-melted material. The (smallest) lateral spacing of the weld seams is typically at least 1.5 mm.

In an alternative variant, it is provided that an end face of a first busbar and an end face of a second busbar are arranged in a manner bearing against one another, in particular are pressed against one another, and the weld seam is placed along the joint of the end faces. This procedure allows a compact, material-saving set-up of the sequence of busbars. In this variant, the welding is generally effected as full penetration welding, i.e. the weld seam projects as far as the underside of the busbars. If desired, during full penetration welding at the seam underside a wire can be inserted, which is welded in during the welding process and can prevent notching (also called "seam collapse"). The material of the wire is typically chosen to be identical to the material of the busbars.

In one preferred variant, the method is effected with
Cu busbars having a thickness t, where 6 mm≤t≤12 mm, preferably 8 mm≤t≤10 mm,
a total used maximum laser power GL where 12 kW≤GL≤20 kW, preferably GL=16 kW;
a feed speed v, where 2 m/min≤v≤4 m/min;
a proportion AK, allotted to the core focus portion, of the total laser power used in total during welding, where AK≥70%, preferably AK≥75%;
a focus position FL of the reshaped laser beam, where −4 mm≤FL≤+1 mm, preferably −3 mm≤FL≤0 mm;
a protective gas flow rate SGF of argon, where SGF≥15 l/min, preferably SGF≥25 l/min;
a wavelength λ of the reshaped laser beam where 1000 nm≤λ≤1100 nm;
a beam parameter product BPP of the raw laser beam where
4 mm*mrad≤BPP≤16 mm*mrad; and
a diameter DR of the ring focus portion and a diameter DK of the core focus portion at a focus, where 150 μm≤DK≤250 μm and 500 μm≤DR≤900 μm. These parameters have enabled relatively thick Cu busbars to be joined very well.

In an alternative, likewise preferred variant, the method is effected with
Cu busbars having a thickness t where 2 mm≤t≤4 mm,
a total used maximum laser power GL where 5 kW≤GL≤10 kW, preferably 6 kW≤GL≤8 kW;
a feed speed v, where v≥3 m/min; preferably v≥6 m/min;
a proportion AK, allotted to the core focus portion, of the total laser power used in total during welding, where 50%≤AK≤75%, preferably AK=55%;
a focus position FL of the reshaped laser beam, where −3 mm≤FL≤0 mm;
a protective gas flow rate SGF of argon, where SGF≥15 l/min, preferably SGF≥25 l/min;
a wavelength λ of the reshaped laser beam where 1000 nm≤λ≤1100 nm;
a beam parameter product BPP of the raw laser beam, where 2 mm*mrad≤BPP≤8 mm*mrad; and
a diameter DR of the ring focus portion and a diameter DK of the core focus portion at a focus, where 35 μm≤DK≤200 μm and 120 μm≤DR≤700 μm. These parameters have enabled relatively thin Cu busbars to be joined very well.

The scope of the present invention also includes a busbar arrangement, comprising at least two busbars, the busbars being joined by laser welding by means of an above-described method according to embodiments of the invention. The busbar arrangement has a high mechanical strength and a low electrical resistance.

Further advantages of the embodiments of the invention are evident from the description and the drawing. Likewise, according to embodiments of the invention, the features mentioned above and those that will be explained still further can be used in each case individually by themselves or as a plurality in any desired combinations. The embodiments shown and described should not be understood as an exhaustive enumeration, but rather are of exemplary character for outlining embodiments of the invention.

FIG. 1 illustrates an exemplary apparatus 1 which can be used for reshaping a raw laser beam 2 according to an embodiment of the invention.

A laser source 3 generates the raw laser beam 2, which here is directed via a focusing lens 5 onto the input end 4a of a multiclad fiber 4, here a 2in1 fiber, cf. the propagation direction AR.

A first part 2a of the cross section of the raw laser beam 2 is fed into a core fiber 8 of the multiclad fiber 4 without deflection. By means of a wedge plate 6, a second part 2b of the cross section of the raw laser beam 2 is deflected and fed into a ring fiber 7 of the multiclad fiber 4.

In the multiclad fiber 4, the laser power of the two parts 2a, 2b is distributed uniformly in each case in the course of advancing in the ring fiber 7 and in the core fiber 8; it should be noted that the length of the multiclad fiber 4 is illustrated in a shortened manner in FIG. 1. At an output end 4b of the multiclad fiber, a reshaped laser beam is provided (not illustrated in more specific detail, but cf. FIG. 2 and FIG. 3 in this respect); the reshaped laser beam is typically imaged onto the busbars to be welded via a lens system, usually comprising a collimation lens and a focusing lens (likewise not illustrated in more specific detail, but cf. FIG. 6 in this respect).

For setting the parts 2a, 2b or the power proportions for the core focus portion and the ring focus portion, the wedge plate 6 here can be moved in the direction R transversely with respect to the propagation direction AR.

Figure 2:
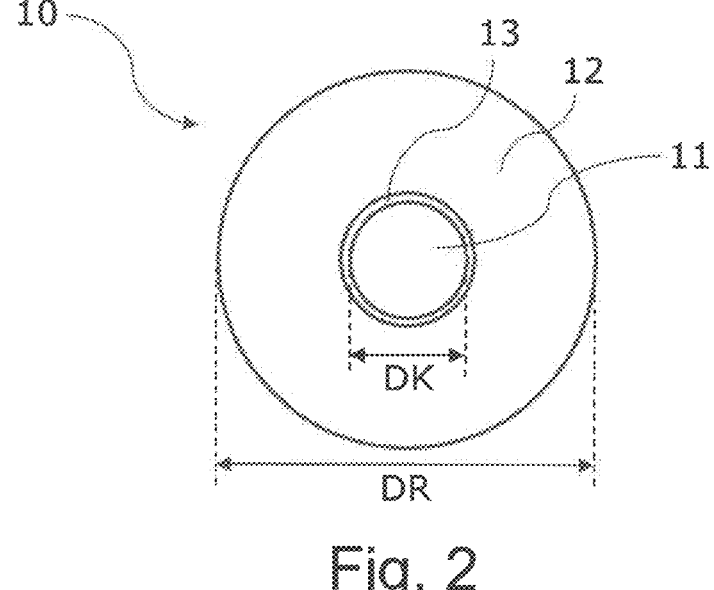
FIG. 2 shows a schematic cross section of a reshaped laser beam, according to some embodiments of the invention.

FIG. 2 illustrates the beam cross-section of the reshaped laser beam 10 such as can be observed for example at the surface of an irradiated busbar. The reshaped laser beam 10 has a core focus portion 11 surrounded coaxially by a ring focus portion 12. A region 13 with lower laser intensity typically lies between the core focus portion 11 and the ring focus portion 12. The diameter DR of the ring focus portion 12 here is approximately 3.5 times the diameter DK of the core focus portion 11.

Figure 3:
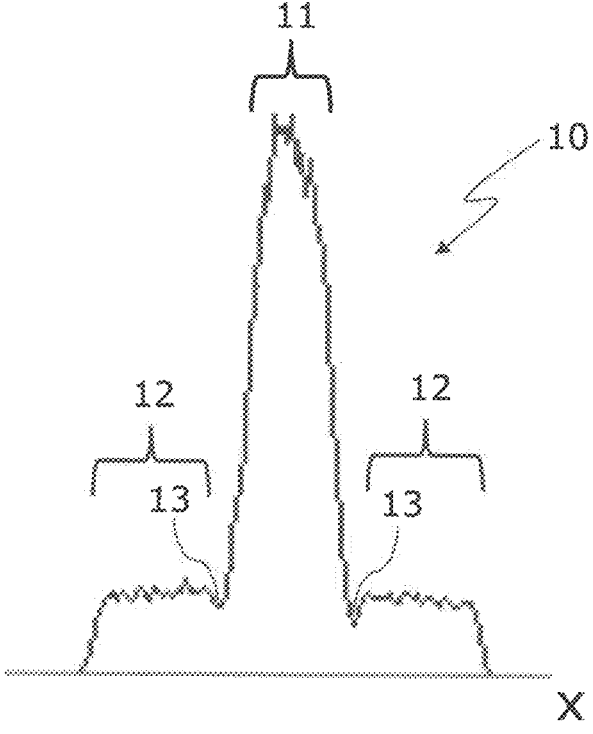
FIG. 3 shows a schematic intensity distribution of a reshaped laser beam, along a direction x transversely with respect to the propagation direction of the reshaped laser beam according to some embodiments of the invention.

FIG. 3 illustrates a typical intensity distribution of the reshaped laser beam 10 in cross section along a direction x leading through the center of the cross section of the reshaped laser beam 10; the local laser intensity is plotted upward, and the location along the direction x toward the right.

Within the core focus portion 11 the laser power is approximately constant, typically with a fluctuation of a maximum of 25% around the average value in the core focus portion 11. Likewise, the laser power in the region of the ring focus portion 12 is approximately constant, typically likewise with a fluctuation of a maximum of 25% around the average value in the ring focus portion. It is readily discernible in the diagram that the (average) intensity of the reshaped laser beam 10 in the region of the core focus portion 11 is significantly greater than that in the region of the ring focus portion 12, here approximately 8 times greater. With the geometry present here, approximately 50% of the total laser power is allotted to the core focus portion 11, and the remainder, here likewise approximately 50% of the total laser power, is allotted to the laser power.

It should be noted that a plurality of concentric ring focus portions can also be provided in the beam cross-section of the reshaped laser beam, in particular by a multiclad fiber with two or more ring fibers being used for the reshaping (not illustrated in more specific detail).

Figure 4:
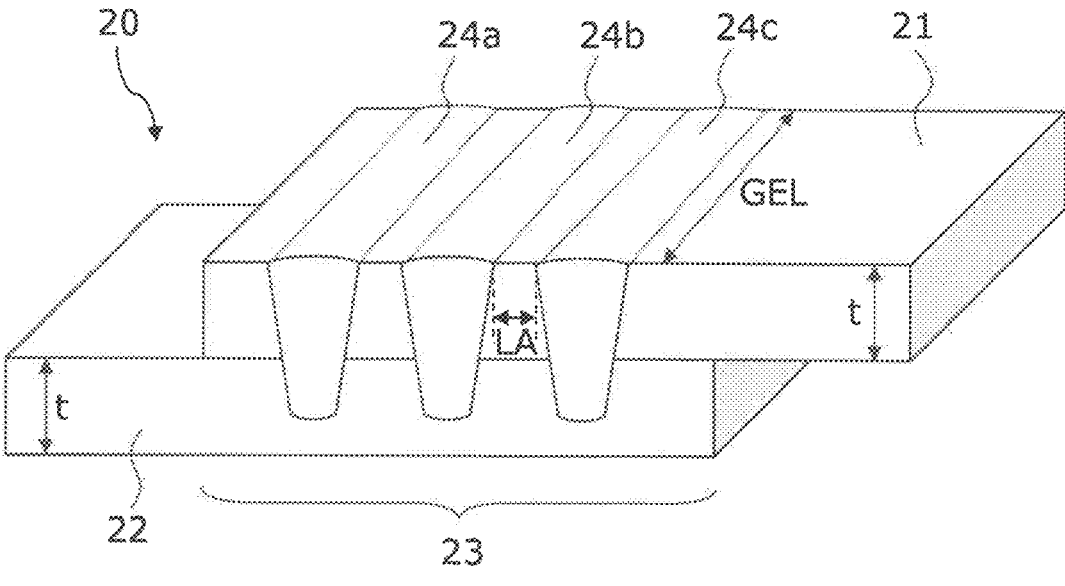
FIG. 4 shows a schematic oblique view of overlap seams of busbars that were produced by the method according to some embodiments of the invention.

FIG. 4 shows, in a schematic oblique view, a busbar arrangement 20 of two busbars 21, 22, which overlap, i.e. are arranged one on top of the other, in an overlap region 23. The busbars 21, 22 were welded and thus joined (joined together) by laser welding using a reshaped laser beam (cf. FIGS. 1-3 above) in the context of the invention.

In this case, the reshaped laser beam was directed onto the upper, first busbar 21 and guided a total of three times over the full width of the busbars 21, 22, as a result of which three weld seams 24a, 24b, 24c having a respective total length GEL and lying next to one another were produced. In the weld seams 24a-24c, in this case the first, upper busbar 21 was melted over its full thickness t, and the lower, second busbar 22 was melted over approximately 60% of its thickness t. Here the weld seams 24a-24c thus only project into the second busbar 22 ("partial penetration welding"), but not through the latter. It should be noted that in other variants of the embodiments of the invention the weld seams can also project completely through the lower, second busbar ("full penetration welding") (not illustrated in more specific detail, but cf. FIG. 5). Furthermore, the weld seams 24a-24c here are separate from one another, such that the associated melted regions do not adjoin one another, but rather are separated from one another by unmelted material, cf. the (smallest) lateral spacings LA at the top side of the first busbar 21.

Figure 5:
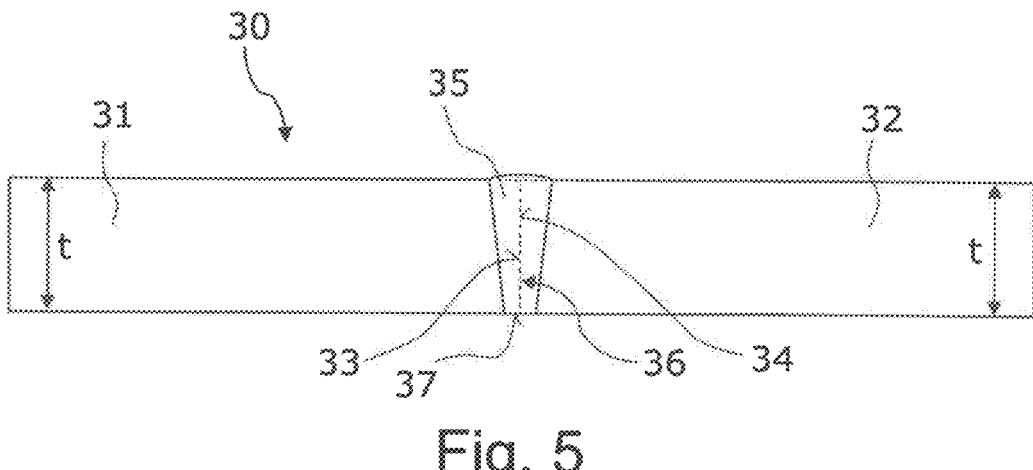
FIG. 5 schematically shows a front view of a butt seam of busbars that was produced by the method according to embodiments of the invention.

FIG. 5 shows a front view of a busbar arrangement 30 having a first busbar 31 and a second busbar 32, which were arranged in a butt joint with end faces 33, 34 bearing against one another (cf. dashed structures). The busbars 31, 32 were once again welded and thus joined (joined together) by laser welding using a reshaped laser beam (cf. FIGS. 1-3 above) in the context of the invention.

In this case, the end faces 33, 34 of the busbars 31, 32 were melted over the full thickness t of the two busbars 31, 32, as a result of which a weld seam 35 was obtained. In this case, the reshaped laser beam was guided along the joint 36, i.e. the area of contact between the end faces 33, 34 (here perpendicular to the plane of the drawing). If necessary, it is possible to prevent a seam collapse at the underside 37 of the weld seam 35 by supplying an additional material, for instance a wire, at the underside 37 during the welding process (not illustrated in more specific detail).

Figure 6:
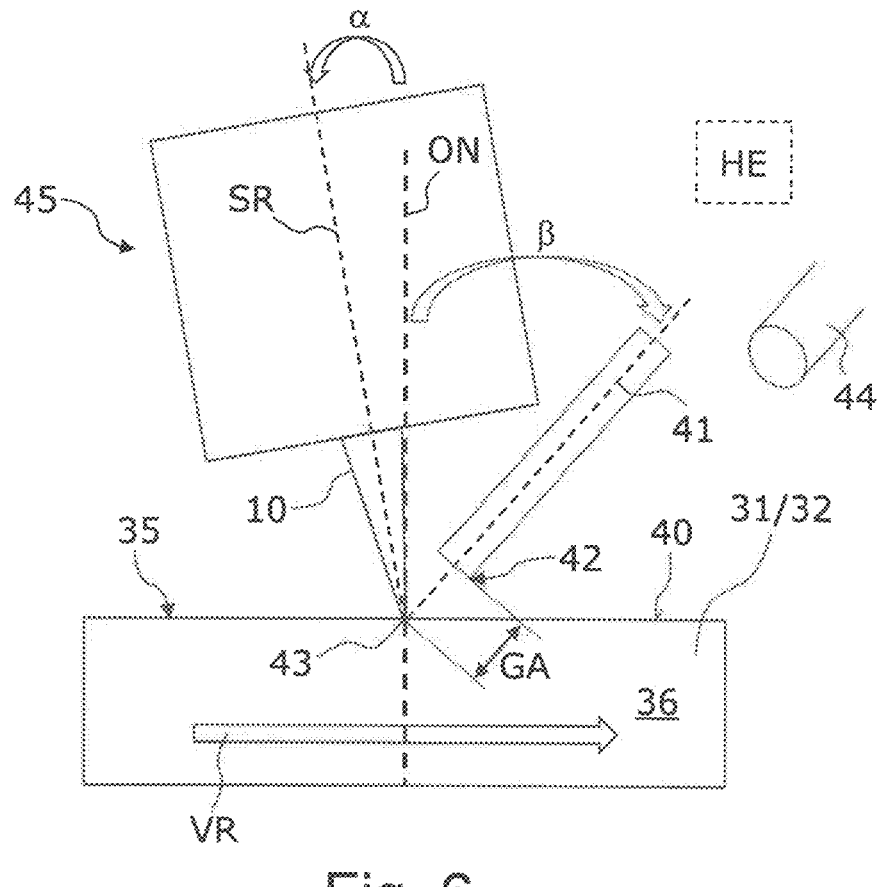
FIG. 6 schematically shows a welding process according to embodiments of the invention with a reshaped laser beam incident at a pivot angle α.

FIG. 6 illustrates the geometric relationship at the incident reshaped laser beam 10 during the laser welding of busbars according to embodiments of the invention, here on the basis of the example of the welding of two busbars 31, 32 in a butt joint (cf. FIG. 5 above); the joint 36 here lies in the plane of the drawing.

The reshaped laser beam 10 is directed by a laser optical unit 45 along its (average) beam direction SR onto the busbar surface 40 and in the process is pivoted by a pivot angle α of here approximately 8° relative to the surface normal ON perpendicular to the busbar surface 40. In this case, the beam direction SR runs in a principal plane HE containing the surface normal ON and the feed direction VR of the laser beam 10; the principal plane HE lies in the plane of the drawing in FIG. 6. It is generally preferably the case that $3° \leq \alpha \leq 8°$, particularly preferably approximately $\alpha=5°$. It should be noted that for the feed of the laser beam 10 relative to the busbars 31, 32, the laser optical unit 45 can be moved relative to stationary busbars 31, 32, or vice versa.

In the variant shown, the beam direction SR is inclined toward the already produced weld seam 35 (the latter is merely depicted schematically with regard to the side in FIG. 6) ("leading welding"); alternatively, the beam direction can also be inclined away from the already produced weld seam ("trailing welding", not illustrated in more specific detail).

Furthermore, a protective gas supply is provided, which directs a protective gas flow along a gas supply axis 41 onto the impingement point 43 of the laser beam 10 on the busbar surface 40 or the melt pool. The gas supply axis 41 here is pivoted away from the already produced weld seam 35 by a gas supply pivot angle β of approximately 40° relative to the surface normal ON; the following generally preferably holds true: 20°≤β≤60°. The gas supply axis 41 here likewise lies in the principal plane HE. An outlet orifice 42 of the gas supply is spaced apart from the impingement point 43 by a gas supply distance GA, where it is generally preferably the case that 3 cm≤GA≤10 cm; GA=6 cm was chosen in the present case.

In the variant shown, the reshaped laser beam 10 is focused onto the busbar surface 40, corresponding to a focus position FL of 0 mm. In other variants, the focus of the reshaped laser beam can also lie below the busbar surface (i.e. in the material of the busbars 31, 32) ("negative focus position", not illustrated in more specific detail).

Moreover, a camera system 44 is provided here, which monitors the position of the busbars 31, 32 and of the joint 35 before and during the welding process, and can be used to control and possibly correct the alignment of the reshaped laser beam 10 or of the impingement point 43 with respect to the joint 36. In this case, the laser beam 10 can be aligned by a scanner optical unit (not illustrated in more specific detail) integrated into the laser optical unit 45, for example.

Figure 7:
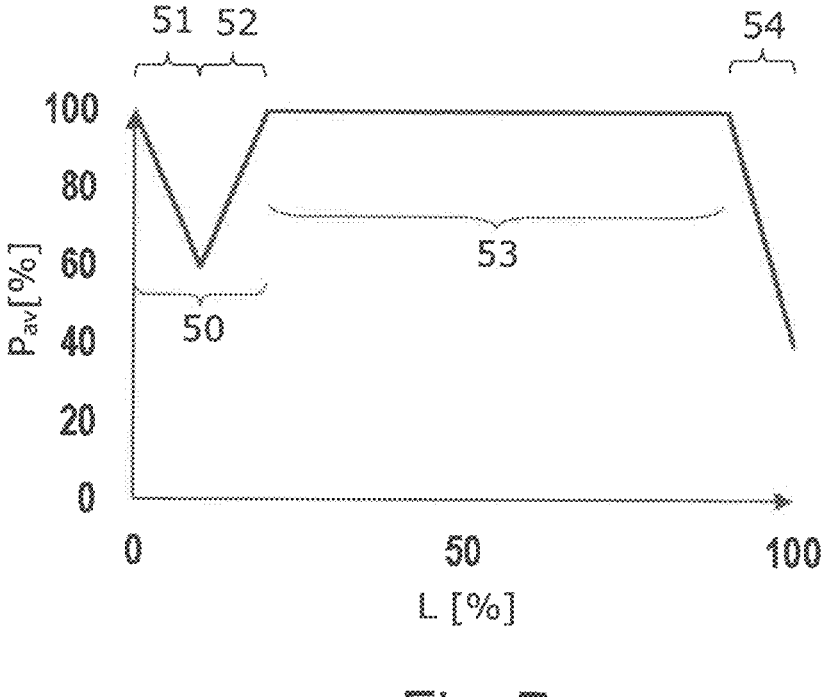
FIG. 7 schematically shows the laser power used in a welding process according to embodiments of the invention as a function of the location along the weld seam.

FIG. 7 illustrates by way of example an instantaneous laser power Pay typically employed during the welding method according to embodiments of the invention, and expressed in % of the maximally used laser power, as a function of the location (welding distance) L of the impingement point of the reshaped laser beam along the weld seam, expressed in % of the total length of the weld seam to be produced (L thus indicates the welding distance hitherto covered by the impingement point or part of the total length of the weld seam). It should be noted that the instantaneous laser power is specified in a manner averaged over pulses and pulse pauses in the case of a pulsed laser beam.

At the beginning of the welding process, in a start section 50 the laser power is initially decreased in a first part 51, here from 100% to approximately 60%, and the laser power is increased again in a second part 52, here from approximately 60% to 100% again. The start section 50 here comprises approximately 20% of the total length of the weld seam, and the two parts 51, 52 are of approximately equal length.

In a middle section 53 the laser power here remains constant at 100%. The middle section 53 here comprises approximately 70% of the total length of the weld seam.

Finally, in an end section 54 the laser power is decreased again, specifically here from 100% to approximately 40%. The end section 54 here comprises approximately 10% of the total length of the weld seam.

All power changes are effected here linearly with the location (welding distance) L, which is particularly simple to control. The feed speed typically remains constant during the welding of the entire weld seam. Furthermore, the power distribution between core focus portion and ring focus portion (or ring focus portions) typically remains constant during the welding of the entire weld seam.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 apparatus
2 raw laser beam
2*a* first part (raw laser beam)
2*b* second part (raw laser beam)
3 laser source
4 multiclad fiber
4*a* input end
4*b* output end
5 focusing lens
6 wedge plate
7 ring fiber
8 core fiber
10 reshaped laser beam
11 core focus portion
12 ring focus portion
13 region with lower laser intensity
20 busbar arrangement
21 first busbar
22 second busbar
23 overlap region
24*a*-24*c* weld seams
30 busbar arrangement
31 first busbar
32 second busbar
33 end face
34 end face
35 weld seam
36 joint
37 underside
40 busbar surface
41 gas supply axis
42 outlet orifice of the gas supply
43 impingement point
44 camera system
45 laser optical unit
50 start section
51 first part (start section)

52 second part (start section)
53 middle section
54 end section
AR propagation direction
DK diameter of core focus portion
DR diameter of ring focus portion
GAgas supply distance
GEL total length (weld seam)
HE principal plane
L location (length) along the weld seam
ON surface normal
Pay instantaneous (average) laser power
SR beam direction
t thickness (busbar)
VR feed direction
x direction transversely with respect to the beam direction
α pivot angle
β gas supply pivot angle

The invention claimed is:

1. A method for joining busbars, the method comprising:
emitting, using a laser source, a raw laser beam,
reshaping the raw laser beam to obtain a reshaped laser beam, wherein the reshaped laser beam comprises a core focus portion and at least one ring focus portion, the core focus portion and the at least one ring focus portion being coaxial with respect to one another and the ring focus portion surrounding the core focus portion,
directing the reshaped laser beam to a plurality of busbars to weld the plurality of busbars to one another along at least one weld seam,
at a beginning of welding of a start section of the weld seam, initially decreasing an instantaneous average laser power of the reshaped laser beam and then increasing the instantaneous average laser power, and
during welding of an end section of the weld seam, decreasing the instantaneous average laser power.

2. The method as claimed in claim 1, wherein the reshaping of the raw laser beam is effected by using a multiclad fiber, wherein a first part of the raw laser beam is fed into a core fiber of the multiclad fiber and at least one second part of the raw laser beam is fed into a ring fiber of the multiclad fiber at an input end, the ring fiber surrounds the core fiber, and the reshaped laser beam is obtained at an output end of the multiclad fiber.

3. The method as claimed in claim 1, wherein the instantaneous average laser power is initially decreased and then increased continuously during the welding of the start section, and is decreased continuously during the welding of the end section.

4. The method as claimed in claim 3, wherein the instantaneous average laser power is initially decreased and then increased linearly with time during the welding of the start section, and is decreased linearly with time during the welding of the end section.

5. The method as claimed in claim 3, wherein the instantaneous average laser power is initially decreased and then increased linearly with a welding distance during the welding of the start section, and is decreased linearly with the welding distance during the welding of the end section.

6. The method as claimed in claim 1, wherein, compared with a maximally used laser power, the instantaneous average laser power is initially decreased by 30-50% and then increased by 30-50% during the welding of the start section, and the instantaneous average laser power is decreased by 50-70% during the welding of the end section.

7. The method as claimed in claim 1, wherein a division of the laser power between the core focus portion and the at least one ring focus portion remains constant during the welding of the start section and the welding of the end section compared with the welding of a middle section of the weld seam between the start section and the end section.

8. The method as claimed in claim 1, wherein for a proportion AK, allotted to the core focus portion, of a total laser power used in total during the welding, the following holds true: $50\% \leq AK \leq 80\%$.

9. The method as claimed in claim 1, wherein for a diameter DR of the ring focus portion and a diameter DK of the core focus portion, the following holds true:

$$1.5 \leq DR/DK \leq 6.$$

10. The method as claimed in claim 1, wherein the reshaped laser beam is directed onto the busbars along a beam direction during the welding, the beam direction being inclined toward or inclined away from a already produced weld seam by a pivot angle a relative to a surface normal of the busbars facing the reshaped laser beam in a principal plane containing the surface normal and a feed direction of the welding process,
where $3o \leq \alpha \leq 80$.

11. The method as claimed in claim 1, wherein, during the welding, a protective gas is guided onto a melt pool at a surface of the busbars.

12. The method as claimed in claim 1, wherein a position of the busbars is determined by a camera system, and wherein the reshaped laser beam is directed onto the busbars by a scanner optical unit, the scanner optical unit being aligned in an automated manner using the position of the busbars determined by the camera system during the welding.

13. The method as claimed in claim 1, wherein a first busbar and a second busbar of the plurality of busbars are arranged in an overlapping manner in an overlap region, and the at least one weld seam is placed in the overlap region, such that the weld seam projects through the first busbar right into the second busbar or through the second busbar.

14. The method as claimed in claim 13, wherein a plurality of weld seams are placed next to one another in the overlap region of the first and second busbars, such that each of the plurality of weld seams projects through the first busbar right into the second busbar or through the second busbar.

15. The method as claimed in claim 1, wherein the plurality of busbars includes a first busbar and a second busbar, an end face of the first busbar and an end face of the second busbar are arranged in a manner bearing against one another, and the weld seam is placed along a joint of the end face of the first busbar and the end face of the second busbar.

16. The method as claimed in claim 1, wherein—the plurality of busbars comprises Cu busbars having a thickness t, where 6 mm≤t≤12 mm
a total used maximum laser power GL where 12 kW<GL<20 kW;
a feed speed v, where 2 m/min≤v≤4 m/min;
a proportion AK, allotted to the core focus portion, of a total laser power used in total during the welding, where AK≥70%;
a focus position FL of the reshaped laser beam, where −4 mm≤FL≤+1 mm;
a protective gas flow rate SGF of argon, where SGF≥15 1/min;
a wavelength X of the reshaped laser beam where 1000 nm≤X≤1100 nm;

a beam parameter product BPP of the raw laser beam where 4 mm*mrad≤BPP≤16 mm*mrad; and a diameter DR of the ring focus portion and a diameter DK of the core focus portion at a focus, where 150 um≤DK≤250 μm and 500 um≤DR≤900 um.

17. The method as claimed in claim 1, wherein the plurality of busbars comprises Cu busbars having a thickness t where 2 mm≤t≤4 mm, a total used maximum laser power GL where 5 kW≤GL≤10 kW;

a feed speed v, where v≥3 m/min;

a proportion AK, allotted to the core focus portion, of a total laser power used in total during the welding, where 50%≤AK≤75%;

a focus position FL of the reshaped laser beam, where −3 mm≤FL≤0 mm;

a protective gas flow rate SGF of argon, where SGF≥15 l/min;

a wavelength λ of the reshaped laser beam where 1000 nm≤λ≤1100 nm;

a beam parameter product BPP of the raw laser beam, where 2 mm*mrad≤BPP≤8 mm*mrad; and a diameter DR of the ring focus portion and a diameter DK of the core focus portion at a focus, where 35 μm≤DK≤200 μm and 120 μm≤DR≤700 μm.

18. A busbar arrangement, comprising at least two busbars, the two busbars being joined by laser welding by the method as claimed in claim 1.

19. The method as claimed in claim 2, wherein the reshaping of the raw laser beam is effected by a wedge plate disposed in a light path of the second part of the raw laser beam, so that the second part of the raw laser beam is fed into the ring fiber of the multiclad fiber.

*  *  *  *  *